(12) United States Patent
Chern et al.

(10) Patent No.: US 9,835,775 B2
(45) Date of Patent: Dec. 5, 2017

(54) IMAGE-CAPTURING MODULE

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: Everready Precision Ind. Corp., Kaohsiung (TW)

( * ) Notice: Subject to any disclaimer, the term of this patent is extended or adjusted under 35 U.S.C. 154(b) by 188 days.

(21) Appl. No.: 14/594,634

(22) Filed: Jan. 12, 2015

(65) Prior Publication Data

US 2016/0124129 A1    May 5, 2016

(30) Foreign Application Priority Data

Oct. 31, 2014   (TW) ............................. 103137849 A
Oct. 31, 2014   (TW) ............................. 103219359 U

(51) Int. Cl.

| H04N 5/232 | (2006.01) |
|---|---|
| G02B 5/04 | (2006.01) |
| H04N 5/225 | (2006.01) |
| G02B 13/06 | (2006.01) |
| G02B 26/08 | (2006.01) |
| G02B 26/10 | (2006.01) |
| H04N 5/349 | (2011.01) |

(52) U.S. Cl.
CPC ............. *G02B 5/04* (2013.01); *G02B 13/06* (2013.01); *G02B 26/0883* (2013.01); *G02B 26/108* (2013.01); *H04N 5/2254* (2013.01); *H04N 5/2259* (2013.01); *H04N 5/23238* (2013.01); *H04N 5/349* (2013.01)

(58) Field of Classification Search
CPC ........ G02B 5/04; G02B 26/108; G02B 13/06; G02B 26/0883; H04N 5/2254; H04N 5/23238; H04N 5/2259; H04N 5/349
See application file for complete search history.

(56) References Cited

U.S. PATENT DOCUMENTS

| 2,508,789 | A | * | 5/1950 | Harrison | ................ | G03B 41/08 |
|---|---|---|---|---|---|---|
| | | | | | | 352/119 |
| 5,280,363 | A | * | 1/1994 | Nakamura | ............... | G04F 13/02 |
| | | | | | | 348/E3.008 |
| 2015/0373262 | A1 | * | 12/2015 | Georgiev | ............... | G03B 17/17 |
| | | | | | | 348/218.1 |

* cited by examiner

*Primary Examiner* — Twyler Haskins
*Assistant Examiner* — Angel L Garces-Rivera
(74) *Attorney, Agent, or Firm* — Muncy, Geissler, Olds & Lowe, P.C.

(57) ABSTRACT

An image-capturing module successively captures light data in batches for a scene of a whole field of view by adjusting the position of a multifaceted prism, and executes patch process on these batches of the light data to acquire an image over the whole field of view in a higher imaging quality that is generally achieved by a camera module with large number of pixels. The movable multifaceted prism may be together with an image sensing module and a lens module to be within a holder to have a compact volume for an image-capturing mobile phone, wearable device, and/or smart opto-electronics.

6 Claims, 6 Drawing Sheets

IMAGE-CAPTURING MODULE

FIELD OF THE INVENTION

The present invention relates to an image-capturing module, and more particularly to an image-capturing module which is also associated with an invisible structured lighting.

BACKGROUND OF THE INVENTION

Image sensor is one of key components on determining the quality of image and it takes about 40% cost for the camera module of mobile phone. Image sensor is generally specified by the pixels within the sensor for a camera module in mobile phone. Overall, the more the pixel number of the image sensor is, the better an image resolution is. However, more pixels mean light data of an image to be processed is huge and slows down the rate of image processing. Besides, the more the pixel number of the image sensor is, the smaller the pixel size of a pixel is. A small pixel size could cause insufficient photo-sensitivity. In order to prevent the image from insufficient photo-sensitivity and enhance the quality of the image, the lens number of a lens module needs be added. Consequently, the lens module with more lenses could make the lens module thicker, which is against the current trend of thinning mobile phone. Besides, for smart wearable devices and opto-electronics, which may have various changes on the interaction range as well as the corresponding projecting image, the method of current fixed imaging does not satisfy the demands of the smart wearable devices and opto-electronics.

Accordingly, for the cameras of mobile phone and/or the smart wearable devices the important issues are to improve the imaging function, the image quality, the volume, and/or the size of an imaging component or module.

SUMMARY OF THE INVENTION

An image-capturing module is provided to apply to thin and small-size communication mobile devices, apparatus or wearable devices and smart opto-electronics. The image-capturing module includes a movable multifaceted prism and an imaging-sensing module. By adjusting the position of the movable multifaceted prism, light data for a scene of a whole field of view may be captured in batches. Each batch of the light data could be sensed by the whole imaging-sensing module and collected to patch a whole image of the whole field of view. Such an approach of capturing in batches and image patching may both satisfy scope adjustment of captured image and hence, enhance the quality of the whole image.

An image-capturing module is provided to include a movable multifaceted prism. By adjusting the position of the movable multifaceted prism, the light data for the scene of the whole field of view may be captured in batches, and each batch could be sensed by the whole imaging-sensing module, even though the image-capturing module is equipped with an image sensor in lower pixel number. Such an approach applying on the equipped image sensor in lower pixel number may reduce the cost of the image-capturing module.

An image-capturing module is provided to include a movable multifaceted prism. By adjusting the position of the movable multifaceted prism, the light data of the whole field of view for a scene may be captured in batches. The field of view of each batch is smaller than the whole field of view, and the light data of each hatch is collected together to patch a whole image. Such an approach may speed up the processing of capturing image and acquire a wide-view image.

In accordance with an aspect of the present invention, an image-capturing module, configured to capture an image of a scene, includes: an image-sensing member; a lens module; a movable light-selecting module including a multifaceted prism, wherein the face number of the multifaceted prism is large than three, and the multifaceted prism includes at least a first face and a second face different from each other; and a housing accommodating the image-sensing member, the lens module, and the movable light-selecting module, wherein light data of the visible scene from the outside of the housing enters into the housing, and the multifaceted prism is adjusted to permit a first portion and a second portion of the light data to enter into the multifaceted prism from the first face and the second face, respectively, and wherein the first portion and the second portion of the light data pass through the multifaceted prism and lens module in sequence and then are received by the image-sensing member.

In an embodiment, the first face or the second face includes a function zone distributed over a whole or a portion of the first face or the second face, and the function zone is a selector of visible light or infrared light, or the light of thermal range, or a diffractive zone, or combination thereof.

In an embodiment, the geometric shapes of the first face and the second face are different or identical.

In an embodiment, the first face or the second face is flat or curved.

In an embodiment, the movable light-selecting module further includes a connecting member and a rotating member rotating or wiggling the connecting member, and the connecting member connects the multifaceted prism to drive the multifaceted prism moving.

In an embodiment, the housing includes a window to allow the light data from the outside of the housing to enter into the multifaceted prism, and the housing is opaque.

In an embodiment, the first portion and the second portion of the light data is corresponding to a portion of a field of view for the visible scene or the other corresponding range of wavelength band.

In accordance with another aspect of the present invention, an image-capturing module, configured to capture an image of a scene comprising a first zone and a second zone, includes: an image-sensing member; a lens module; a movable light-selecting module comprising a multifaceted prism and a connecting member driving the multifaceted prism, wherein the face number of the multifaceted prism is large than three, and the multifaceted prism is driven to be in a first position and a second position; and a housing accommodating the image-sensing member, the lens module, and the movable light-selecting module, wherein light data of the first zone at the outside of the housing passes through the multifaceted prism in the first position and the lens module, and is received by the image-sensing member, and wherein light data of the second zone at the outside of the housing passes through the multifaceted prism in the second position and the lens module, and is received by the image-sensing member.

In an embodiment, the multifaceted prism comprises a plurality of faces capable of refracting the light data of the first zone or the second zone, and the geometric shapes of the faces are different or identical.

In an embodiment, each one of the faces includes a function zone distributed over a whole or a portion of the first face or the second face, and the function zone is a selector of visible light, infrared light, or the electromagnetic field of thermal range, or a diffractive zone, or combination thereof.

In an embodiment, any one of the faces is flat or curved.

In an embodiment, the image-sensing member includes a sensor of charged-coupled device, a sensor of complementary metal-oxide-semiconductor, or a sensor for thermal range.

In an embodiment, the field view of the first zone or the field view of the second zone is smaller than the field view of the scene.

In accordance with another aspect of the present invention, a lens assembly includes: a lens module; a movable multifaceted prism, wherein the movable multifaceted prism includes a first face and a second face; and a housing accommodating the lens module and the movable multifaceted prism, and including a first window exposing a portion of the movable multifaceted prism and a second window exposing a portion of the lens module, wherein light data of a scene from the outside of the housing enters into the housing by passing through the first window, the movable multifaceted prism is adjusted to permit a first portion of the light data and a second portion of the light data to enter into the movable multifaceted prism from the first face and the second face, respectively, and then, the first portion and the second portion of the light data pass through lens module in sequence and leave the housing from the second window.

In an embodiment, the first face or the second face includes a function zone distributed over a whole or a portion of the first face or the second face, and the function zone is a selector of visible light or infrared light, or thermal light, or a diffractive zone, or combination thereof.

In an embodiment, the geometric shapes of the first face and the second face are different or identical.

In an embodiment, the first face or the second face is flat or curved.

In an embodiment, the face number of the movable multifaceted prism is six or eight.

From the above descriptions, the present invention provides an image-capturing module successively captures light data in batches for a scene of a whole field of view by adjusting the position of multifaceted prism, and executes patch process on these batches of the light data to acquire an image over the whole field of view in a higher imaging quality that is generally achieved by a camera module with the large number of pixels. The movable multifaceted prism may be together with an image sensing module and a lens module to be within a holder to have a compact volume for a mobile phone with camera, a wearable device, or a smart opto-electronics.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
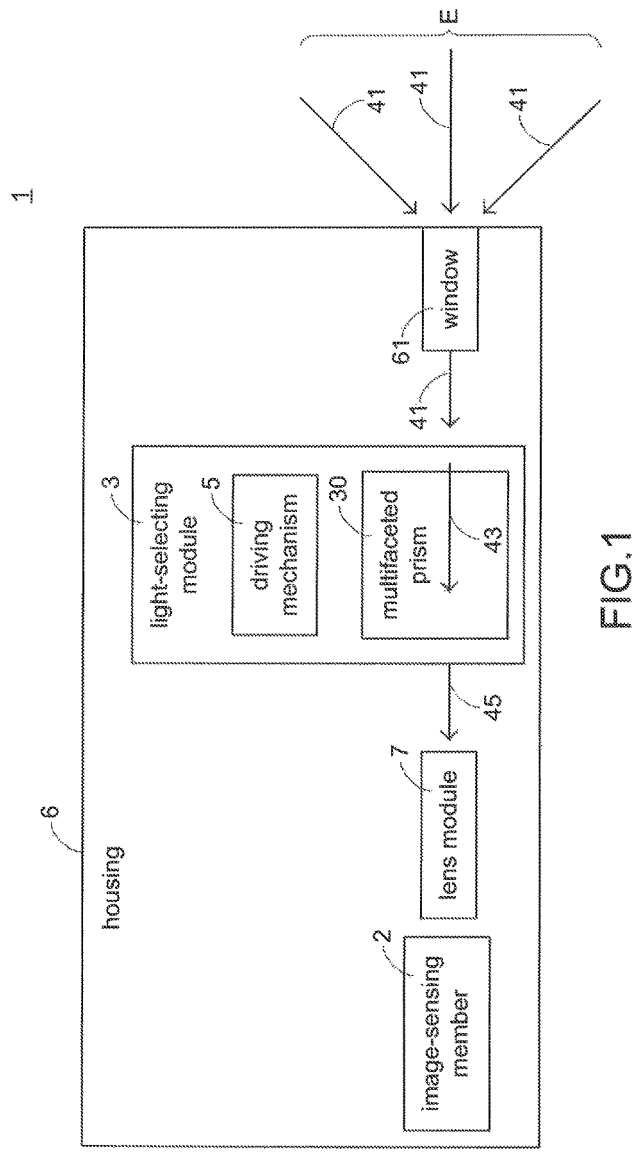
FIG. 1 is a schematic block diagram illustrating the members of an image-capturing module according to an embodiment of the present invention.

FIG. 1 is a schematic block diagram illustrating the members of an image-capturing module. Referring to FIG. 1, an image-capturing module 1 includes an image-sensing member 2, a lens module 7, a movable light-selecting module 3, and a housing 6. The housing 6 provides a space to accommodate the image-sensing member 2, the lens module 7, and the movable light-selecting module 3. In a first embodiment, the housing 6 is opaque, and has a window 61 at a suitable position. Light data 41 from the outside of the housing 6 could enter into the housing 6 by passing through the window 61. The window 61 may be with a suitable size and a shape to prevent outside stray light from entering into the housing 6 and disturbing the operating of members within the housing 6. Next, in the first embodiment, these members and modules within the housing 6 are so arranged that the entering light from the window 61 could pass through the movable light-selecting module 3 and the lens module 7 in sequence, and then be incident onto the image-sensing member 2. For illustration, light data 41 is reflected or emitted from an object within the field of view E for a scene that is captured by the image-capturing module 1. Furthermore, light data 41 may be visible, infrared, near-infrared, thermal, or the combination thereof.

Figure 2:
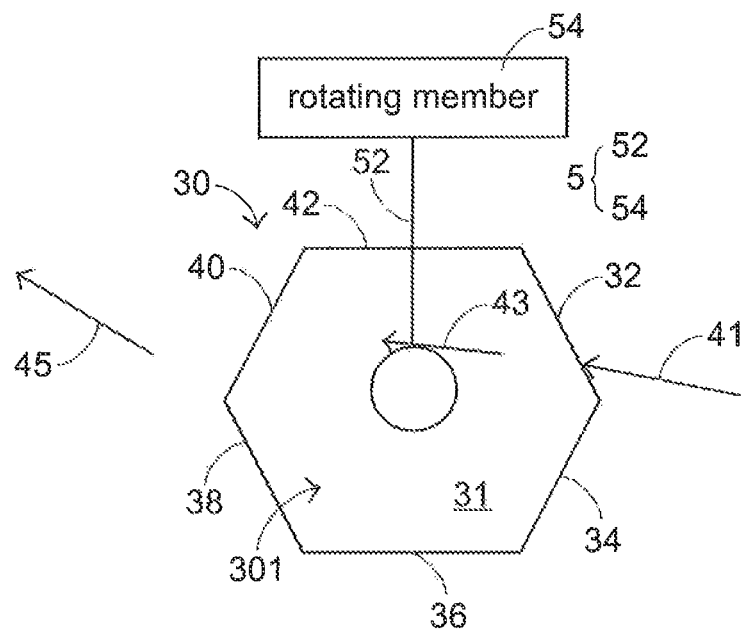
FIG. 2 is a schematic top-view diagram illustrating a movable light-selecting module of the image-capturing module according to the embodiment of the present invention.
Figure 3:
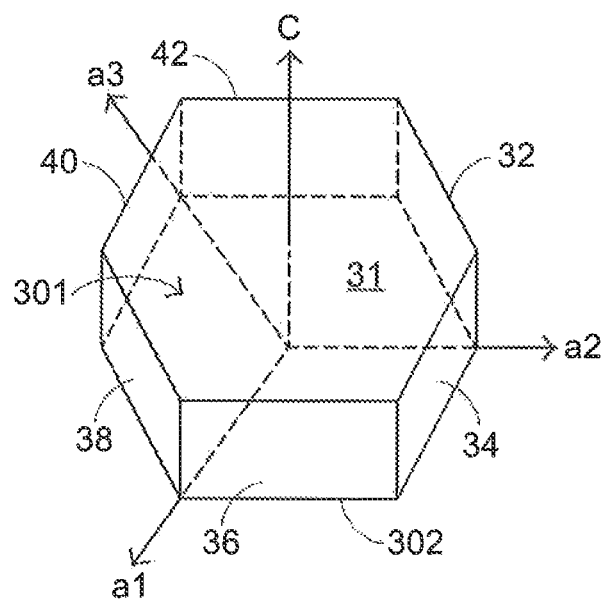
FIG. 3 is a schematic stereoscopically side-view diagram illustrating the movable light-selecting module of the image-capturing module according to the embodiment of the present invention.

FIG. 2 and FIG. 3 are schematic top-view and stereoscopically side-view diagrams illustrating a movable light-selecting module of the image-capturing module, respectively. Please refer to FIG. 2 and FIG. 3, the exemplary movable light-selecting module 3 may include a multifaceted prism 30 and a driving mechanism 5 for rotating the multifaceted prism 30. The multifaceted prism 30 includes a transparent body 31 in a stereoscopic shape enclosed by plural faces 301, 302, 32, 34, 36, 38, 40, and 42. For convenient illustration, the faces 301 and 302 are basal planes and parallel to coplanar axes a1, a2, and a3, and the faces 32, 34, 36, 38, 40, and 42 are prism planes and vertical to the coplanar axes a1, a2, and a3. These prism planes are also parallel to axis C. Next, the connecting member 52 of the driving mechanism 5 may connect one of the faces 301 and 302 to hold and adjust the position of the multifaceted prism 30. The faces 32, 34, 36, 38, 40, and 42 are configured to permit light to pass through. It is understood that the exemplary multifaceted prism 30 is illustrated with the basal planes and the prism planes, but it is not limited to such a specific shapes in FIG. 2 and FIG. 3. That is, the faces of the multifaceted prism may be designed to be irregular. Furthermore, though the single multifaceted prism is described in FIG. 2 and FIG. 3, however, the combination of plural multifaceted prism may be utilized for the light-selecting module provided that the housing is designed to have enough space.

Figure 4:
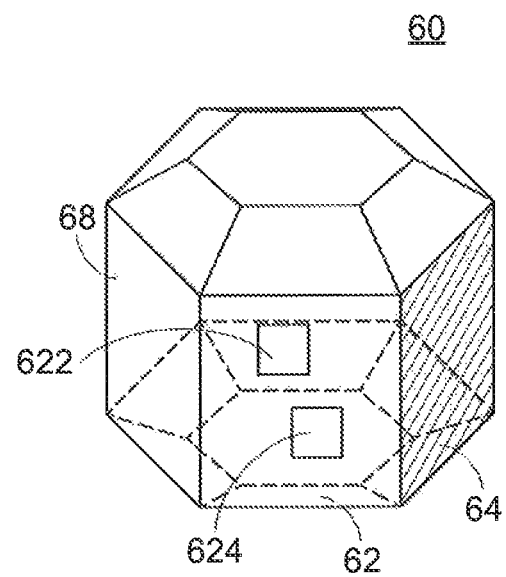
FIG. 4 is a schematic stereoscopically see-through-view diagram illustrating a multifaceted prism of the image-capturing module according to the embodiment of the present invention.

Next, in respect of the body 31, there are definite boundaries among the faces 32, 34, 36, 38, 40, and 42, and each angle between any two next to each other of these faces is less than 180 degrees. These angles among the faces 32, 34, 36, 38, 40, and 42 are different or identical. Furthermore, the faces 32, 34, 36, 38, 40, and 42, flat or curved, may have different or identical geometric shapes or lengths. There may be different or the same surface structures on the faces 32, 34, 36, 38, 40, and 42. For example, these surface structures may be designed to perform the function of refraction, penetration, filtering, or diffraction, but not limited to. Next, FIG. 4 is a schematic stereoscopically see-through-view diagram illustrating a multifaceted prism of the image-capturing module. A multifaceted prism 60 has plural faces 62, 64, and 68 for passing the light data. For example, but not limited to, there are function zones 622 and 624 on the face 62. The portions except of the function zones 622 and 624 on the face 62 may permit the light data to enter into the multifaceted prism 60, or to pass through and then leave the multifaceted prism 60. The function zones 622 and 624 may process the light data in the same or different ways, for example, the function zone 622 is capable of diffracting the light data, while the function zone 624 only permits infrared light to pass through. Furthermore, there may be a filtering coating formed in a suitable way on the face 64 to permit light in a specific wavelength to pass through, while the light data is not processed when it passes through the face 68. Next, the face number of the multifaceted prism 60 is larger than three, or four faces are better, or six or eight faces are preferred.

Next, please refer to FIG. 1, FIG. 2, and FIG. 3, when the light data 41 from the outside of the multifaceted prism 30 reaches any face of the multifaceted prism 30, for example, the face 32, the light data 41 may enter into the body 31 after passing through the face 32. It is understood that the transmitting angle within the body 31 and the incident angle onto the face 32 for the light data 41 are different because of the differences between the medium of the body 31and the medium of air (outside of the multifaceted prism 30). Under the design of the multifaceted prism 30, the light data 43 within the body 31 could reach another face of the multifaceted prism 30, for example, pass through the face 40, and then leave the multifaceted prism 30 to become light data 45. In this embodiment, the light data 43 in the body 31 travels along a non-broken line (straight line), that is, the light data 43 in the body 31 is not reflected or totally reflected by other faces 34, 36, 40, 42 before the light data 43 reaches and passes through the face 38. Moreover, the light data 45 leaving the face 38 is designed to be vertical to the face 38 (normal line of the face 38) for considering the arrangement of sequential components or members. The sequential components or members aforementioned, for example but not limited to, may be lens module or image sensor assembly.

Next, any surface structures on the faces 32, 34, 36, 38, 40, and 42 may be different or identical such that the contents of the light data 41 and 43 may be different or the same. For example, but not limited to, the face 32 may have the function of selecting infrared light. When the light data 41 that includes both visible light data and infrared light data passes through the face 32, only infrared light data is left to become the light data 43. In the case of the face 32 having the function of transmission, the light data 41 passing through the face 32 is only refracted to become the light data 43. It is understood that the filtering function of the face 32 is not limited to aforementioned, it may be visible-light selecting, infrared-light selecting, near-infrared-light selecting, selecting on the light in thermal range, or mixing mode.

Figure 5:
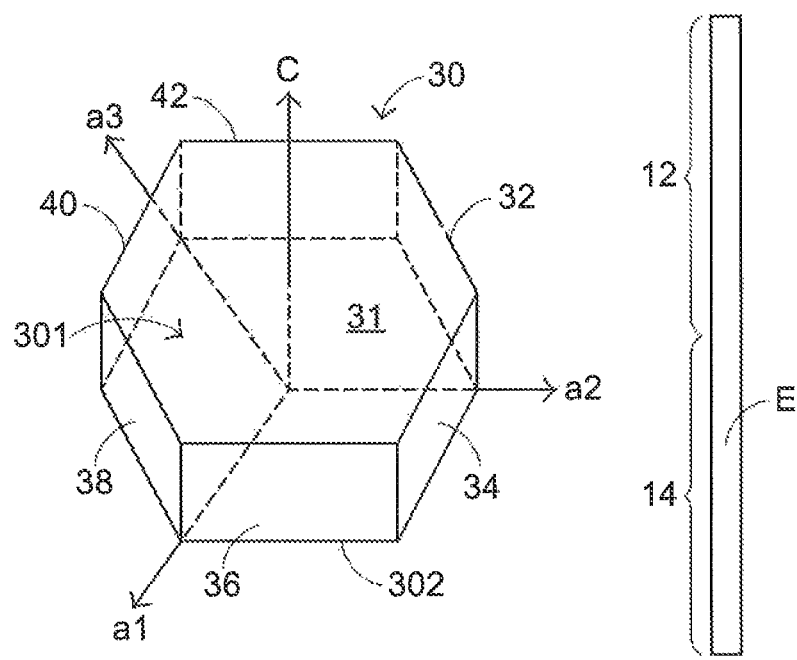
FIG. 5 is a schematic side-view diagram illustrating the different positions of the movable light-selecting module and the field of view E according to the embodiment of the present invention.
Figure 6:
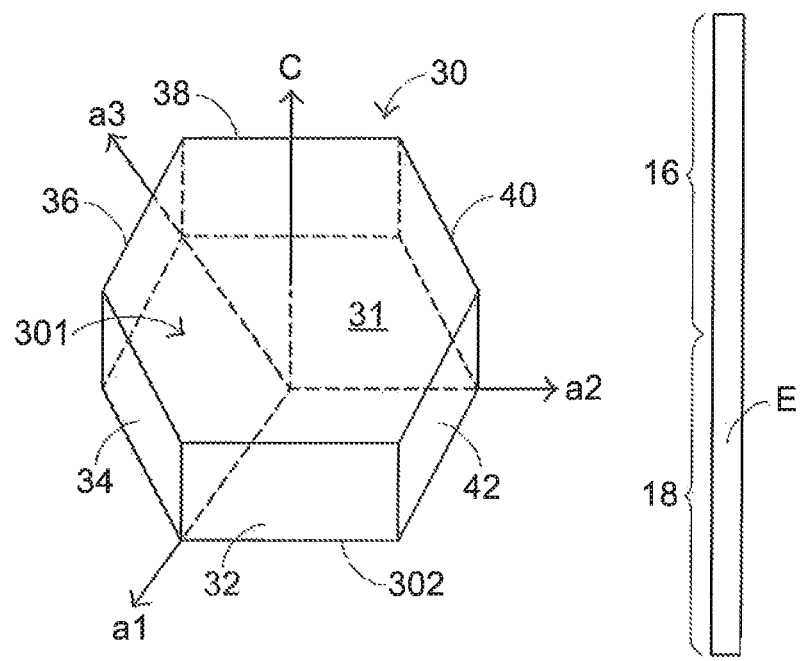
FIG. 6 is a schematic side-view diagram illustrating the different positions of the movable light-selecting module and the field of view E according to the embodiment of the present invention.
Figure 7:
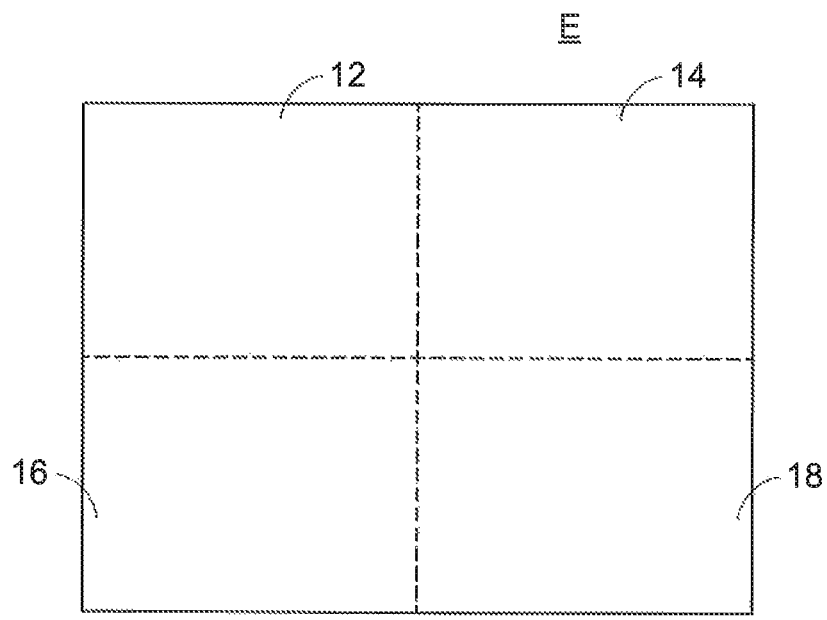
FIG. 7 is a schematic front-view diagram illustrating the field of view E according to the embodiment of the present invention.

FIG. 5 and FIG. 6 are schematic side-view diagrams illustrating the different positions of the movable light-selecting module and the field of view E. FIG. 7 is a schematic front-view diagram illustrating the field of view E. Please refer to FIG. 2, FIG. 5, FIG. 6, and FIG. 7, the driving mechanism 5 includes a connecting member 52 and a rotating member 54. The rotating member 54 rotates or wiggles the connecting member 52, and the connecting member 52 connects the multifaceted prism 30 by holding the face 301. The multifaceted prism 30 could be rotated in the way of the axis C as a rotating axis. When the multifaceted prism 30 is rotated, the geometric center or center of the multifaceted prism 30 is fixed, or moved along the coplanar plane of axes a1, a2, and a3, or moved a little bit in the direction of axis C. The directions of the faces 32, 34, 36, 38, 40, and 42 are changed along with the rotation of the multifaceted prism 30. For example, in FIG. 5, when the multifaceted prism 30 is in a first position, the light data of the first zone 12 and the second zone 14 for the filed of view E pass through the window of the housing, and enter into the multifaceted prism 30 from the faces 32 and 34, respectively. The condition that only the light data of the first zone 12 enters into the multifaceted prism 30 could work. Next, in FIG. 6, the multifaceted prism 30 is changed to be at a second position because of being rotated. At the moment, the light data of a third zone 16 and a fourth zone 18 for the field of view E pass through the window of the housing and enter into the multifaceted prism 30 from the faces 40 and 42, respectively. Alternatively, in the condition that the light data of the first zone 12 enters into the multifaceted prism 30 when the multifaceted prism 30 is in the first position, the multifaceted prism 30 in the second position enables the face 32 face the second zone 14 and the light data of the second zone 14 may enter into the multifaceted prism 30 from the face 32. It is noted that the shapes or numbers of the zones for the field of view E are not limited to the one shown in FIG. 7. These zones may be not overlapped or overlapped, and the light data of overlapped zone may be processed by a suitable subsequent image analysis. Such an image analysis for data is well known or available in literatures, and not mentioned in the present invention.

Accordingly, the image-capturing module 1 may capture the reflected light or emitting light from an object within the field of view. In the present invention, the image-capturing module 1 is equipped with the movable light-selecting module 3 in which the positions of the multifaceted prism 30 are changeable. When the multifaceted prism 30 is at the first position, the face 32 may receive the light data 41 of the first zone 12 for the field of view E. The field of view corresponding to the first zone 12 is smaller than the whole field of view E. The light data 41 of the first zone 12 may be sensed by the total sensing pixels of the image-sensing member 2 after entering into the image-capturing module 1, so that the image of the first zone 12 in a higher resolution is acquired. It is understood that, even the light data 41 of both the first zone 12 and the second zone 14 are simultaneously received by the image-capturing module 1, the sensing pixels for each of the zones are still more than the one of all zones for the whole field of view E simultaneously. The driving mechanism 5 may adjust the multifaceted prism 30 quickly, such that the capturing time of the image-capturing module could not be longer or delayed. It is advantageous that the image-capturing module 1 equipped with the movable light-selecting module 3 is capable of using an image-sensing member with less sensing pixels to achieve a high resolution that is generally acquired by a sensor with more sensing pixels. The light data of different zones within the whole field of view are captured in batches by the help of changing of the movable light-selecting module 3, and the captured light data of each zone could be sensed by the whole pixels of the image-sensing member 2. The light data of all zones are patched together and processed to acquire the image of the whole field of view E in a higher quality. Accordingly, it is not necessary for an image-sensing member to enhance sensing capability by using higher pixels. For example, the image-sensing member 2 is a sensor of five million pixels (5 MP), and the field of view is divided into four zones for capturing. The light data of each zone is sensed by the five million pixels of the image-sensing member 2. Thus, the light data for the whole field of view is equal to be sensed by twenty million pixels, and the image quality of the whole field of view is enhanced. Such an approach is especially beneficial for an image-capturing module for zooming. Besides, by the way of division of zones associated with the changing of the movable light-selecting module 3, the range of the field of view can be extended because the light data of each zone is sensed by the total number of pixels of the image-sensing member. Thus, the capturing result of the field of view is improved and a wide-angle result can be acquired.

Furthermore, the image sensor having a bigger pixel size may be applied to the image-capturing module. The use of the image sensor having the bigger pixel size may improve photo-sensitivity, and therefore, the image quality. It may also prevent the image-capturing module from adding the number of lens in the lens module 7. The less number of lenses reduces the use of space for the lens module of the image-capturing module in the housing 6. Consequently, the image-sensing module 2, the lens module 7, the movable light-selecting module 3 are accommodated within the housing 6, and such an image-capturing module does not occupy much space within a mobile phone when the image-capturing module is applied to the mobile phone. Accordingly, the image-capturing module of the present invention is suitable to apply to not only a front camera module but also a rear camera module of a thin and compact mobile device, apparatus or wearable electronics.

It is understood that a wide-angle image is acquired by the view-patching approach, but the image-capturing module in the present invention is not limited to acquire an image with the wider field of view. The image-capturing module may be used to acquire a narrow-angle image in higher resolution by using the single face of the multifaceted prism to receive the light data of a field of view. A user may get the image of any field of view by selecting various modes of the movable light-selecting module in the present invention.

Moreover, another shape-changing method of the multifaceted prism, but not limited to, is to use the connecting member 52 as a wiggling axis. The position of the multifaceted prism is changed along with the wiggling of the connecting member, and the geometric center or general center of the multifaceted prism may be wiggled, too. The directions of the faces of the movable multifaceted prism are moved or wiggled along with the wiggling of the connecting member, and the position of the movable multifaceted prism is changed or adjusted from the first position to the second position.

Next, referring to FIG. 1 again, the driving mechanism 5 may further include a control circuit. The image-sensing member 2 may include a CCD, CMOS image sensor, or thermal image sensor, or further include an associated circuit, such as a processor, control circuit and storage medium. Furthermore, the lens module 7 may include plural lenses, two or four pieces for example, and lens stands, but not limited to in the present invention.

Figure 8:
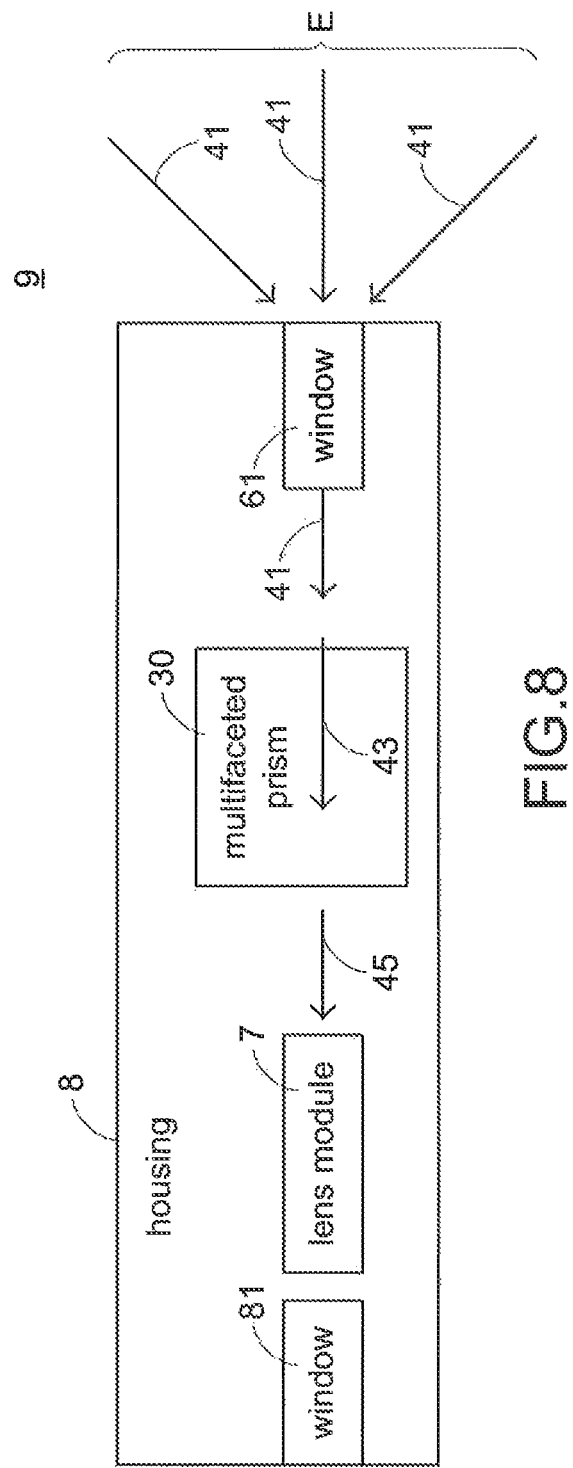
FIG. 8 is a schematic block diagram illustrating a assembly according to the embodiment of the present invention.
Figure 9:
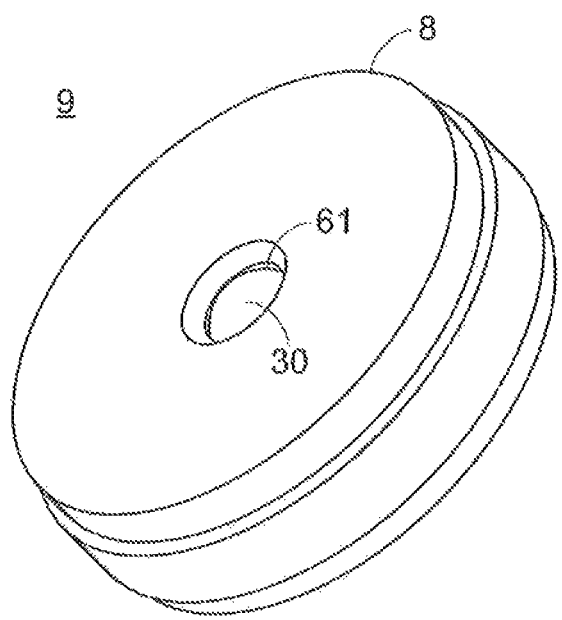
FIG. 9 is a physical appearance illustrating the lens assembly according to the embodiment of the present invention.

FIG. 8 is a schematic block diagram illustrating a lens assembly, and FIG. 9 is a physical appearance illustrating the lens assembly. Compared with the image-capturing module 1 in FIG. 1, a housing 8 of a image-capturing module 9 only accommodates a lens module 7 and a multifaceted prism 30, and has another window 81(a second window), so that the light data passing through the lens module 7 may emit out from the window 81. Accordingly, the image-capturing module 9 may be associated with any suitable image sensor if necessary, and be applied more flexibly. It is understood that other components, such as the portion or the whole of the driving mechanism, are still accommodated and integrated into the housing or on the housing.

While the invention has been described in terms of what is presently considered to be the most practical and preferred embodiments, it is to be understood that the invention needs not be limited to the disclosed embodiments. On the contrary; it is intended to cover various modifications and similar arrangements included within the spirit and scope of the appended claims which are to be accorded with the broadest interpretation so as to encompass all such modifications and similar structures.

What is claimed is:
1. An image-capturing module, configured to capture an image of a field of view for a visible scene and generate a corresponding light data of the image, comprising:
   an image-sensing member;
   a lens module;
   a movable light-selecting module comprising a multifaceted prism, wherein the face number of the multifaceted prism is large than three, and the multifaceted prism comprises at least a first face and a second face different from each other; and
   a housing accommodating the image-sensing member, the lens module, and the movable light-selecting module, wherein the light data obtained by capturing an image of a specified field of view for the visible scene includes a first portion and a second portion respectively corresponding to different portions of the image of the specified field of view for the visible scene, and the multifaceted prism is adjusted to permit the first portion and the second portion of the light data to sequentially enter the multifaceted prism from the first face and the second face, respectively, and wherein each of the first portion and the second portion of the light data passes through the multifaceted prism and the lens module in sequence and then received by the image-sensing member.

2. The image-capturing module according to claim 1, wherein the multifaceted prism comprises at least one function zone disposed at or distributed over the first face and/or the second face for filtering or processing the light data passing therethrough.

3. The image-capturing module according to claim 2, wherein the function zone or zones exhibit different light-filtering or light-processing functions.

4. The image-capturing module according to claim 1, wherein the first face or the second face is flat or curved.

5. The image-capturing module according to claim 1, wherein the movable light-selecting module further comprises a connecting member coupled to the multifaceted prism and a rotating member coupled to the connecting member, and when the rotating member rotates or wiggles the connecting member the multifaceted prism is ratated or wiggled to have the first portion and second portion of the light data pass through the first face and second face of the multifaceted prism in sequence.

6. The image-capturing module according to claim 1, wherein the housing comprises a window to allow the light data to pass through the housing and enter the multifaceted prism, and the housing is opaque.

* * * * *